United States Patent
Ciarniello et al.

(10) Patent No.: US 8,978,072 B2
(45) Date of Patent: Mar. 10, 2015

(54) METHOD AND SYSTEM FOR THE PROVISION OF PACKET MOBILE DIGITAL BROADCAST SERVICES

(75) Inventors: Alberto Ciarniello, Rome (IT); Antonia Napolitano, Rome (IT); Giacomo-Edgardo Rosellini, Rome (IT)

(73) Assignee: Telecom Italia S.p.A., Milan (IT)

( * ) Notice: Subject to any disclaimer, the term of this patent is extended or adjusted under 35 U.S.C. 154(b) by 1146 days.

(21) Appl. No.: 12/452,006

(22) PCT Filed: Jun. 14, 2007

(86) PCT No.: PCT/EP2007/005257
§ 371 (c)(1),
(2), (4) Date: Apr. 19, 2010

(87) PCT Pub. No.: WO2008/151651
PCT Pub. Date: Dec. 18, 2008

(65) Prior Publication Data
US 2010/0199316 A1    Aug. 5, 2010

(51) Int. Cl.
*H04N 5/445* (2011.01)
*H04N 7/16* (2011.01)
*H04N 7/173* (2011.01)
(Continued)

(52) U.S. Cl.
CPC ............... *H04H 60/91* (2013.01); *H04W 4/06* (2013.01); *H04W 12/06* (2013.01)
USPC ............ 725/62; 725/59; 725/106; 455/432.1; 455/436; 455/437

(58) Field of Classification Search
CPC .......... H04N 5/4401; H04N 21/41407; H04N 21/6131; H04H 20/57; H04H 20/30; H04W 48/18; H04W 36/00; H04W 36/0083; H04W 88/06; H04W 88/10; H04J 11/0093
USPC ........... 725/59, 62, 105, 106, 131; 455/432.1, 455/436, 437
See application file for complete search history.

(56) References Cited

U.S. PATENT DOCUMENTS

| 5,974,328 A | 10/1999 | Lee et al. |
| 2005/0289589 A1 | 12/2005 | Vermola |

(Continued)

FOREIGN PATENT DOCUMENTS

| WO | WO 01/45446 A1 | 6/2001 |
| WO | WO 03/001772 A2 | 1/2003 |
| WO | WO 2006/014076 A1 | 2/2006 |

OTHER PUBLICATIONS

International Search Report from the European Patent Office for International Application No. PCT/EP2007/005257, mailed Mar. 28, 2008.

(Continued)

*Primary Examiner* — Hai V Tran
(74) *Attorney, Agent, or Firm* — Finnegan, Henderson, Farabow, Garrett & Dunner, L.L.P.

(57) ABSTRACT

A method for enabling a broadcast/cellular device within a coverage area of a cellular network to access packet mobile digital broadcast services offered by a cellular operator of the cellular network, includes: a) obtaining a first identifier identifying the cellular operator; and b) accessing a storage area in order to retrieve a second identifier identifying and enabling access to the packet mobile digital broadcast services offered by the cellular operator, based on the first identifier obtained in a).

20 Claims, 5 Drawing Sheets

| First cellular operator identifier | Second DVB-H services identifier |
|---|---|
| ................. | ............... |
| Xxxxxxx | Aaaaaa |
| Yyyyyy | Bbbbbb |
| Zzzzzzz | ——— |
| ................. | ............... |

(51) Int. Cl.
*G06F 3/00* (2006.01)
*G06F 13/00* (2006.01)
*H04W 4/00* (2009.01)
*H04W 36/00* (2009.01)
*H04H 60/91* (2008.01)
*H04W 4/06* (2009.01)
*H04W 12/06* (2009.01)

(56) References Cited

U.S. PATENT DOCUMENTS

2006/0194582 A1* 8/2006 Cooper .................. 455/436
2006/0221901 A1  10/2006 Yaqub et al.
2008/0070557 A1* 3/2008 Paila et al. ............. 455/414.1
2008/0176559 A1* 7/2008 Vare et al. ............... 455/432.1
2008/0214102 A1* 9/2008 Kallio et al. ............ 455/3.03
2008/0242224 A1* 10/2008 Fratti et al. ............. 455/3.06

OTHER PUBLICATIONS

"Digital Video Broadcasting (DVB); Transmission System for Handheld Terminals (DVB-H)," ETSI EN 302 304 v1.1.1, pp. 1-14 (Nov. 2004).

"Digital Video Broadcasting (DVB); IP Datacast over DVB-H: Program Specific Information (PSI)/Service Information (SI)," ETSI TS 102 470 v1.1.1, pp. 1-37, (Apr. 2006).

* cited by examiner

METHOD AND SYSTEM FOR THE PROVISION OF PACKET MOBILE DIGITAL BROADCAST SERVICES

CROSS REFERENCE TO RELATED APPLICATION

This application is a national phase application based on PCT/EP2007/005257, filed Jun. 14, 2007, the content of which is incorporated herein by reference.

BACKGROUND OF THE INVENTION

1. Field of the Invention

The present invention relates to a method and system for the provision of packet mobile digital broadcast services as, for example, DVB-H (digital video broadcasting-handheld) and DVB-SH (digital video broadcasting-satellite-handheld) services.

2. Description of the Related Art

As disclosed by the technical specification ETSI EN 302 304 V1.1.1 (2004-11), DVB-H is a transmission system using ETSI Digital Video Broadcasting standards, which is targeted to provide multimedia services to handheld terminals (light battery powered apparatuses) over digital terrestrial broadcasting networks. DVB-H is a broadcast transmission system for datagrams, wherein a datagram is a network layer packet with full address information enabling it to be routed to the endpoint without further information. These datagrams may be IP or other datagrams and may contain any types of digital content and services as, for example, data that pertain to multimedia services, file downloading services or other similar services.

Multimedia and data services may be provided to DVB-H terminals either by an organization, "home" organization, operating the service based on specific commercial arrangements with the customer or by other organizations, "visited" organizations, that, for example, operate services in other geographical areas having specific commercial arrangements with the "home" organization.

According to the technical specification ETSI TS 102 470 V1.1.1 (2006-04), a DVB network is uniquely identified by a network identifier (network_id). In a DVB network one or more Transport Streams (TS), each carrying a multiplex, are transmitted by one or more DVB signals. A multiplex is a set of DVB services multiplexed together, and carried on a Transport Stream. A Transport Stream is a bitstream carrying a multiplex. An IP flow is a flow of IP datagrams each sharing the same IP source and destination address. An IP platform is a set of IP flows managed by an organization. In particular, the IP platform represents a harmonized IP address space that has no address collisions. An IP platform is identified by a platform identifier (platform_id). An IP platform may be available on multiple Transport Streams, within one or multiple DVB networks. In such case, each Transport Stream may carry any subset of the IP flows of the IP platform.

In general, to access packet mobile digital broadcast services offered by a specific organization, a handheld device within the organization's home network needs to know specific identifying information (e.g., the platform identifier of the IP platform managed by such organization) which enables it to identify, among the Transport Streams that reach the broadcast receiver thereof, the IP flows of the IP platform managed by such organization.

Analogously, when roaming into a visited network managed by a "visited" organization, the handheld device needs to know identifying information which enables it to identify the packet mobile digital broadcast services offered by such visited organization, in order to enable the user to access such services.

WO 2006/014076 discloses a broadcast/multicast (BCAST) service system and method that provide inter-network roaming.

In particular, with reference to FIG. 6 of this document, WO 2006/014076 discloses an embodiment wherein the user of a mobile terminal 300 has a subscription to one or more (BCAST) services offered by a home network before the user roams to a visited network. The visited network, which is a broadcast type network, broadcasts its service guide repeatedly using its broadcasting mechanism to all terminals roamed in the visited network. The terminal, which has roamed to the visited network, receives the BCAST service guide of the visiting network. Upon checking the service guide, the user requests a use privilege (access information, e.g., right object(s) RO) in order to access a specific BCAST service identified in the service guide of the visited network. The use privilege is a right with respect to contents requested by the user or a right for accessing or using the BCAST service. The visited network receives the use privilege request and transmits a service authentication request message to the home network. The home network checks the service authentication of the terminal and transmits a service authentication response message to the visited network. The service authentication may involve determining whether or not the current terminal is a subscriber of the home network and examining in detail the subscription policy of the user terminal so as to determine whether or not the user should receive the specific BCAST service requested by the user. If the service authentication result indicates that the terminal is authorized to receive the BCAST service, the visited network transmits the use privilege (access information such as RO) for allowing access and/or use of the specific BCAST service requested by the user, to the user. RO can be a key or code to open or decrypt the BCAST service contents. The visited network transmits the user-requested contents (BCAST service) to the terminal through its broadcast mechanism. Upon receiving the contents, the terminal accesses or interprets the received contents by using the RO.

US 2005/0289589 discloses a system and method for the provision of service listings, channel listings and/or the like to a device, wherein location-appropriate serving parameters (such as network IP addresses, IP multicast addresses, platform parameters, transport stream identifiers, and/or the like) are employed by the device in receiving service listings data, channel listings data and/or the like.

According to the method disclosed by this document, serving parameters corresponding to one or more locations are received and stored at a storage area accessible by the device. Then the location of the device is determined. To this end, a GPS circuitry incorporated into the device may be used or the user may be prompted for the location of the device via a GUI and/or other interface provided by the device. Otherwise, cell and/or network identifiers might be received and used to determine the device's location, for example by consulting an accessible storage area that associated such identifiers with geographical locations. The known location of the device is then employed in retrieving various corresponding service parameters employable in the receipt of location-appropriate serving listings data, channel listings data and/or the like. The retrieved serving parameters are then used to format and send a request for a serving listing to a service provider.

Therefore, according to the technique disclosed by this document the appropriate serving parameters to be used for receiving location-appropriate serving listings data, channel listings data and/or the like are each time retrieved by the device, based on the current location of the device.

SUMMARY OF THE INVENTION

The Applicant faced the problem of enabling a broadcast device to access packet mobile digital broadcast services in a simple and effective way.

In particular, the Applicant focused on the field of cellular technologies (e.g., GSM, GPRS, UMTS, EDGE) wherein packet mobile digital broadcast services are provided to a broadcast/cellular device through a cellular operator. The cellular operator may be a broadcast operator itself or may be enabled to offer packet mobile digital broadcast services to its subscribers thanks to a specific agreement with a broadcast operator.

The Applicant found that in the field of cellular technologies the above mentioned problem can be solved by a method wherein identifying information—enabling a broadcast/cellular device to identify, among the data flows that reach the broadcast receiver thereof, the data carrying the packet mobile digital broadcast services offered by a cellular operator—is retrieved based on the cellular operator identifier.

Accordingly, in a first aspect the present invention relates to a method for enabling a broadcast/cellular device within a coverage area of a cellular network to access packet mobile digital broadcast services offered by a cellular operator of said cellular network, the method comprising:
  a) obtaining a first identifier identifying the cellular operator;
  b) accessing a storage area (4) in order to retrieve a second identifier identifying, and enabling access to, the packet mobile digital broadcast services offered by the cellular operator, based on the first identifier obtained in a).

According to the method of the invention, the second identifier—enabling a broadcast/cellular device to identify, among the data flows that reach the broadcast receiver thereof, the data carrying the packet mobile digital broadcast services offered by a cellular operator—is retrieved based on resources (first identifier of the cellular operator) which, according to cellular technologies, are already at disposal of a cellular device, when it is within the operator's home network or roaming into a cellular visited network.

Typically, said first identifier of the cellular operator is provided to the broadcast/cellular device by the (home or visited) network whenever the cellular device is in the coverage area of the cellular network.

In particular, the method of the invention allows a broadcast/cellular device to access packet mobile digital broadcast services in a useful and effective way, when the device roams into a cellular visited network.

In the present description and claims, the expression
  "cellular device" is used to indicate any device which is able to communicate with a cellular telephone network;
  "able to communicate" is used to indicate the capability of receiving and/or sending data and of processing said data after reception and/or before transmission;
  "broadcast device" is used to indicate a device which is able to make use of packet mobile digital broadcast services broadcasted by a digital broadcaster;
  "broadcast/cellular device" is used to indicate a cellular device which is able to make use of packet mobile digital broadcast services broadcasted by a digital broadcaster;
  "digital broadcast" is used to indicate a unidirectional digital transmission from a broadcaster to a plurality of devices.

A typical example of a broadcast/cellular device may be a handheld mobile phone, a personal digital assistant (PDA), a portable media player with digital broadcasting and cellular capabilities for vehicular or personal use or a portable computer with proper communications modules.

For example, in a 3GPP network the first identifier may comprise a two or three digit number (mobile network code or MNC) which allows a cellular network operator to be uniquely identified all over the world.

Typically, the method further comprises c) obtaining an authorization to register the broadcast/cellular device in the cellular network.

Advantageously, the execution of b) is subordinated to c).

Preferably, the method further comprises d) checking if said first identifier obtained in a) identifies a cellular (preferred) roaming partner operator. Advantageously, the method comprises executing b) in the affirmative case of d). According to an embodiment, the method comprises executing c) in the affirmative case of d).

According to an embodiment, the method further comprises e) checking if said first identifier obtained in a) identifies a cellular home operator. Advantageously, the method comprises executing b) in the affirmative case of e). According to an embodiment, the method also comprises executing c) in the affirmative case of e). Advantageously, the method comprises executing d) in the negative case of e).

The above features advantageously allow a cellular home operator to link its customers, users of broadcast/cellular devices, to the broadcast services offered by himself or to cellular (preferred) roaming partner(s) thereof.

Advantageously, the first identifier is associated with said second identifier in said storage area.

Advantageously, in said storage area a plurality of first identifiers identifying a corresponding plurality of cellular operators are stored, and each first identifier is associated with a respective second identifier identifying packet mobile digital broadcast services offered by the corresponding cellular operator.

Preferably, said storage area is a re-writable storage area.

Advantageously, in said storage area said plurality of first identifiers are associated with the respective second identifiers in at least one mapping table.

In one embodiment, b) is subordinated to: f) verifying that cellular operator identified by said first identifier offers packet mobile digital broadcast services.

Advantageously, the check in f) is performed on said storage area.

Said storage area may be comprised in the broadcast/cellular device or in a memory module (e.g., a memory card) accessible by the broadcast/cellular device.

Preferably, said storage area is comprised in a Subscriber Identity Module (SIM) card accessible by the broadcast/cellular device. Considering that a SIM card may be remotely accessed to by a cellular operator, this advantageously allows the storage area to be remotely updated by the cellular operator, in case of need. Moreover, considering that access to SIM card stored information is protected by security procedures (e.g., as foreseen by ISO 7816 and future enhancements based on USB interface), this advantageously allows provision of packet mobile digital broadcast services with a same level of control and security as with cellular services. Further considering that SIM card are removable elements to be used among different compatible terminals, this advantageously allows the user to share packet mobile digital broadcasting services capabilities, including roaming service capabilities, among different compatible devices with no need for device configuration or specific device initialization by the operator.

Advantageously, the method further comprises writing the second identifier retrieved in b) in a specific memory area of the broadcast/cellular device.

Advantageously, the method further comprises using the second identifier retrieved in b) for identifying, among data flows reaching the broadcast/cellular device, the packet mobile digital broadcast services offered by the cellular operator identified by the first identifier and for providing the user of the broadcast/cellular device with an electronic service guide (ESG) comprising and showing a list of services (e.g., TV channels, audio/video based services) offered by the cellular operator.

According to an embodiment, the packet mobile digital broadcast services are IP services.

According to an embodiment, the second identifier comprises a platform identifier (e.g. DVB-H platform_id) of a (IP) platform managed by the cellular operator.

For example, the broadcast/cellular device is a GSM-GPRS, EDGE or UMTS cellular device supporting also packet mobile digital broadcast technology.

Typical examples of cellular operators are GSM-GPRS, EDGE or UMTS cellular telephone operators.

Typical examples of technologies known in the art for providing packet mobile digital broadcast services are DVB-H, DVB-SH, Media FLO (Forward Link Only), DAB (Digital Audio Broadcast) and DMB (Digital Mobile Broadcast).

In a second aspect the present invention relates to a broadcast/cellular device comprising a cellular receiver and a processing unit, the cellular receiver comprising modules that, when the broadcast/cellular device is within a coverage area of a cellular network, is adapted to receive a first identifier identifying a cellular operator of said cellular network; characterized in that the processing unit comprises modules adapted to access a storage area in order to retrieve a second identifier identifying and enabling access to packet mobile digital broadcast services offered by said cellular operator, based on said first identifier identifying the cellular operator.

Advantageously, the first identifier is associated with said second identifier in said storage area.

Advantageously, the storage area is comprised in a SIM card accessible by the broadcast/cellular device.

Advantageously, in said storage area a plurality of first identifiers identifying a corresponding plurality of cellular operators are stored, wherein each first identifier is associated with a respective second identifier identifying packet mobile digital broadcast services offered by the corresponding cellular operator.

Advantageously, in said storage area said plurality of first identifiers are associated with the respective second identifiers in at least one mapping table.

Advantageously, the modules of the processing unit are adapted to check if said first identifier identifying the cellular operator is comprised in said storage area; in the affirmative, to check in said storage area if said first identifier is associated with a corresponding second identifier; and in the affirmative, to retrieve said second identifier from said storage area.

Typically, the modules of the processing unit are adapted to obtain an authorization to register the broadcast/cellular device in the cellular network.

Advantageously, the modules of the processing unit are adapted to retrieve the second identifier after having obtained said authorization.

Preferably, the modules of the processing unit are adapted to check if said first identifier identifies a cellular (preferred) roaming partner operator and to retrieve the second identifier in the affirmative case.

According to an embodiment, the modules of the processing unit are also adapted to check if said first identifier identifies a cellular home operator and to retrieve the second identifier in the affirmative case.

The broadcast/cellular device further comprises a broadcast receiver.

Advantageously, the modules of the broadcast receiver are adapted to receive the retrieved second identifier from the processing unit or are adapted to read it from a suitable memory area.

Advantageously, the broadcast receiver comprises modules adapted to use the second identifier retrieved from the processing unit for identifying the packet mobile digital broadcast services offered by the cellular operator, as for example an electronic service guide (ESG) comprising and showing a list of services (e.g., TV channels, audio/video based services) offered by the cellular operator.

Typically, the above mentioned modules of the processing unit and of the broadcast receiver are software, firmware and/or hardware modules.

BRIEF DESCRIPTION OF THE DRAWINGS

The features and advantages of the present invention will be made apparent by the following detailed description of some exemplary embodiments thereof, provided merely by way of non-limiting examples, description that will be conducted by making reference to the attached drawings, wherein.

DETAILED DESCRIPTION OF THE INVENTION

For the sake of simplicity, the following description will refers to DVB-H technology. However, it should be clear that the invention applies to comparable packet mobile digital broadcast technologies as well and is applicable also to mobile terminals comprising multiple packet mobile digital broadcast technologies (e.g. a DVB-H/DMB/cellular device or a DVB-H/MediaFLO/cellular device).

Figure 1:
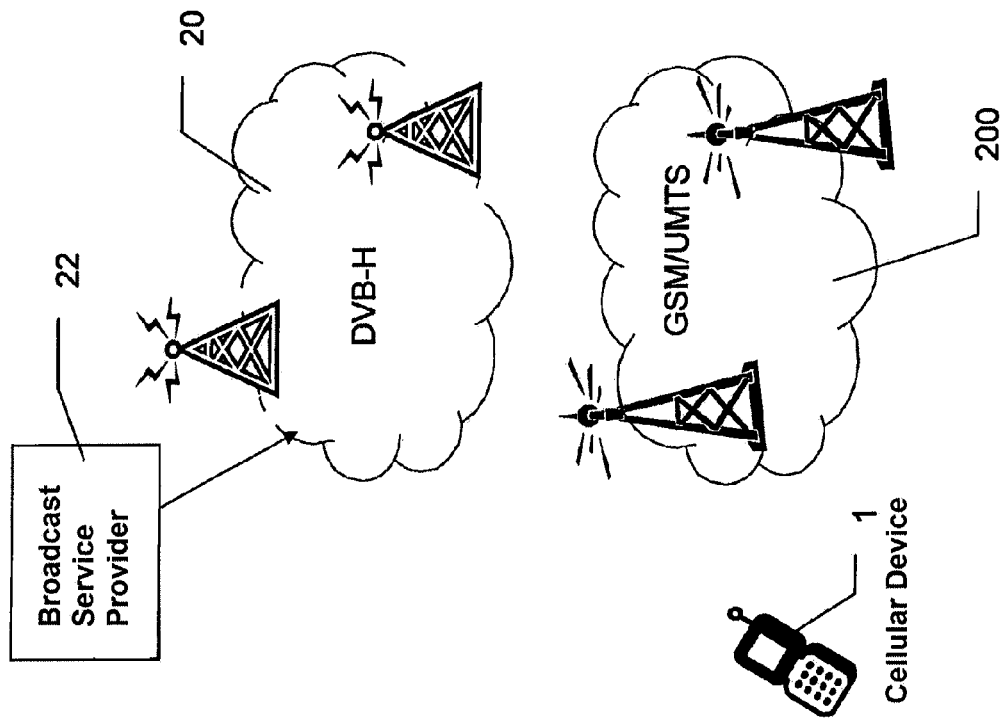
FIG. 1 schematically shows an exemplary implementation scenario of the invention.
Figure 1:
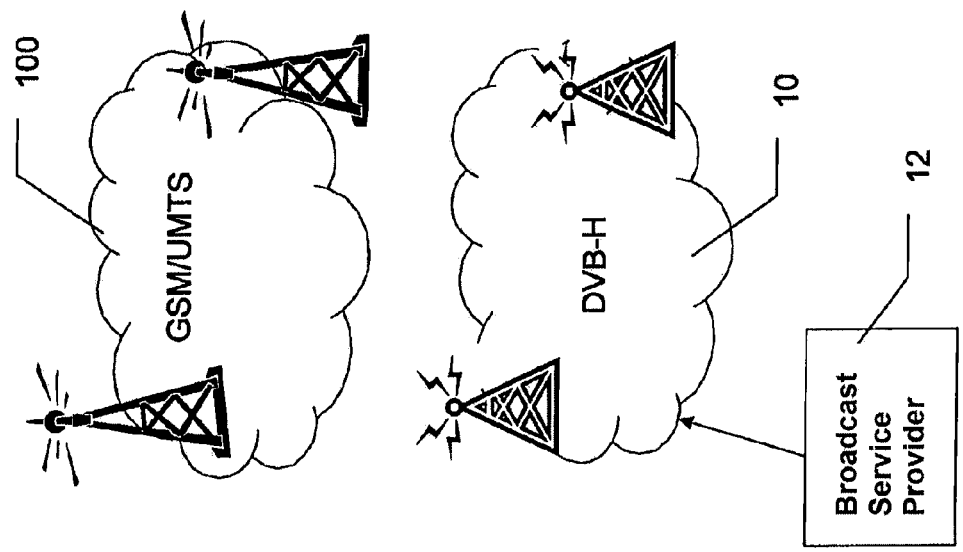

FIG. 1 schematically shows an exemplary implementation scenario of the invention comprising a DVB-H/cellular device 1; two cellular networks 100 and 200; and two DVB-H networks 10 and 20 connected to broadcast service providers 12 and 22 respectively.

Cellular networks 100 and 200 may be, for example, GSM-GPRS or UMTS mobile telephone networks.

As GSM-GPRS and UMTS mobile telephone networks are well known in the art, they will not be further described in detail hereinafter.

The same applies to DVB-H networks 10 and 20 and broadcast service providers 12 and 22.

In the exemplary scenario, the DVB-H/cellular device 1 is a customer of the cellular operator (home operator) offering services in the cellular network 100 (home network) and has a subscription to the cellular and DVB-H services offered by it.

DVB-H services offered by the home operator are provided by the broadcast service providers 12 and broadcasted by the DVB-H network 10.

Cellular network 200 represents a cellular visited network wherein a cellular operator (visited operator) offers DVB-H services provided by the broadcast service providers 22 and broadcasted by DVB-H network 20.

When roaming into the cellular visited network 200, DVB-H/cellular device 1 is required to have appropriate identifying information to be enabled to access the DVB-H services offered by the visited operator of the cellular visited network 200.

According to the invention, said appropriate identifying information is retrieved by DVB-H/cellular device 1 based on an identifier identifying the cellular visited operator.

Figure 2:
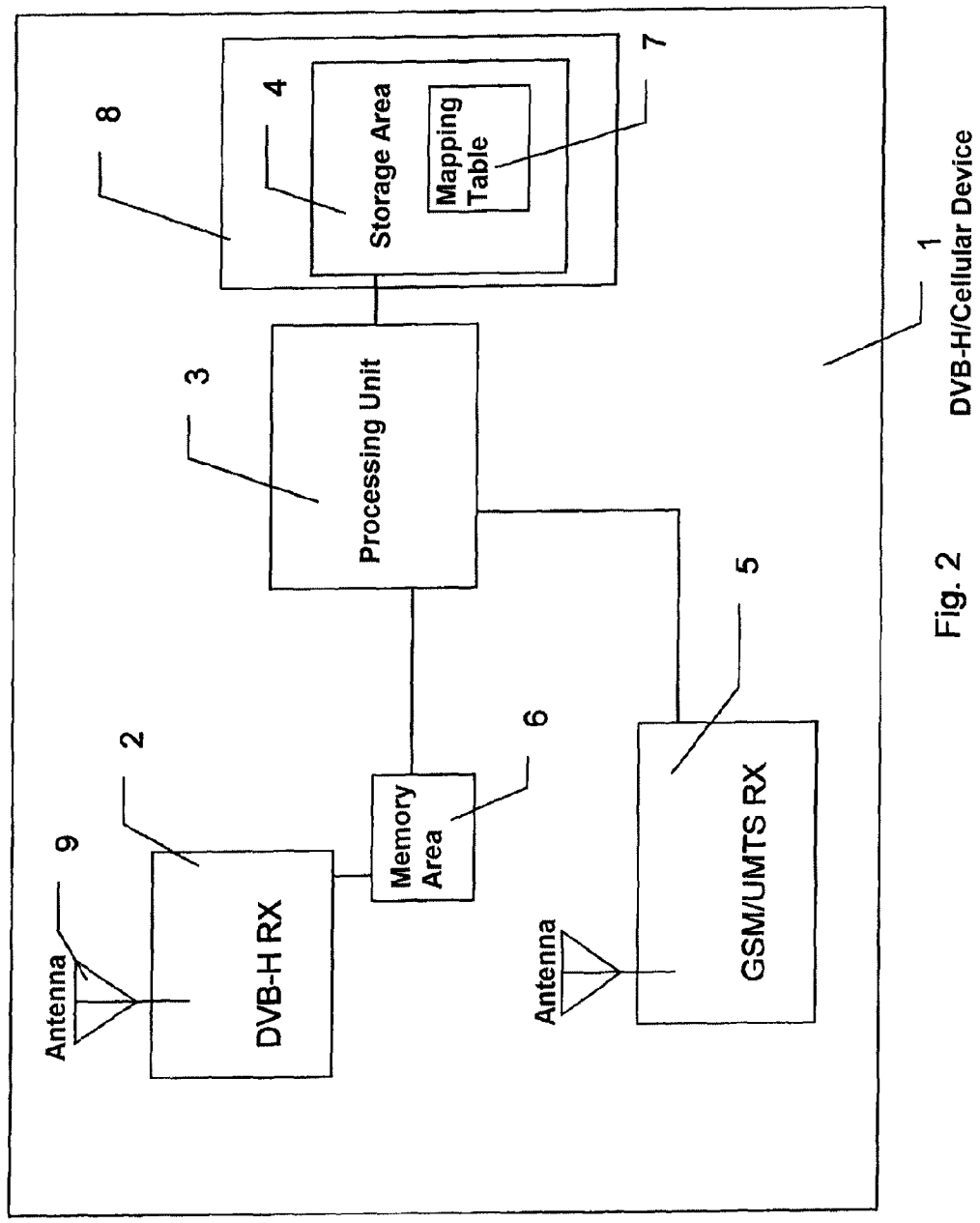
FIG. 2 schematically shows a block diagram of a DVB-H/cellular device according to an embodiment of the invention.

In particular, according to an embodiment of the invention, DVB-H/cellular device 1 comprises (as shown in FIG. 2) a DVB-H receiver 2, a processing unit 3, a cellular receiver 5 and a memory area 6.

DVB-H/cellular device 1 typically comprises also a seat for housing a SIM card (not shown) comprising a storage area 4.

Cellular receiver 5, processing unit 3 and DVB-H receiver 2 comprise software, firmware and/or hardware modules adapted to implement the method of the invention.

In particular, cellular receiver 5 comprises modules adapted to receive, according to techniques well known in the art of cellular telephony, a first identifier identifying the cellular visited operator when DVB-H/cellular device 1 roams into the cellular visited network 200.

Processing unit 3 comprises modules adapted to check, based on the first identifier received at the cellular receiver 5 and according to techniques well known in the art of cellular telephony, if the cellular visited operator is a roaming partner of the cellular home operator. In the positive, said modules are also adapted to carry out a conventional authorization procedure to register the DVB-H/cellular device 1 in the cellular visited network 200 as a roaming partner device.

Once successfully terminated the authorization procedure, the modules of processing unit 3 are adapted to check if the cellular visited operator offers DVB-H services. The check may be performed by the processing unit 3 automatically or under user request (for example, when the user requests—through a suitable user interface—the DVB-H/cellular device 1 for DVB-H services).

When the check has a positive result, the modules of processing unit 3 are adapted to retrieve the appropriate identifying information to identify the DVB-H services offered by the cellular visited operator, based on said first identifier identifying the cellular visited operator. Moreover, they will be adapted to advise the user, through a suitable user interface, that the cellular visited operator does provide DVB-H services. Furthermore, they will also be adapted to switch the DVB-H receiver on to obtain an ESG for displaying to the user the available mobile packet broadcasting services.

On the contrary, when the check has a negative result, the modules of processing unit 3 will be adapted to advise the user, through a suitable user interface, that the cellular visited operator does not provide DVB-H services.

According to an embodiment of the invention, the storage area 4 stores a mapping table 7 (exemplarily shown in FIG. 3) comprising a list of first cellular operator identifiers (e.g., Xxxxxxx; Yyyyyyy and Zzzzzzz), wherein each first identifier is associated with a respective second identifier which allows identifying the DVB-H services offered by the corresponding cellular operator (e.g., Aaaaaa for services offered by cellular operator identified by Xxxxxxx; Bbbbbb for services offered by cellular operator identified by Yyyyyyy; and Cccccc for services offered by cellular operator identified by Zzzzzzz).

Said mapping table 7 may be stored in the SIM card as an extension of a pre-existing cellular roaming table (conventionally used in the field of cellular technology for roaming purposes) or as a separate table.

Storage area 4 is advantageously a re-writable storage area so as to allow updating of the information contained in the mapping table 7, for example when roaming agreements among operators change. The update can be accomplished through operators customer care provisioning or through OTA (over the air) technologies. Access to storage area 4 can be advantageously controlled by security procedures known in the art.

Mapping table 7 can be written in the storage area 4 statically or dynamically (e.g., through OTA technologies) for the time of need, by the cellular home operator.

The modules of processing unit 3 are adapted to perform the above mentioned step of checking if the cellular visited operator offers DVB-H services in the mapping table 7.

Figure 3:
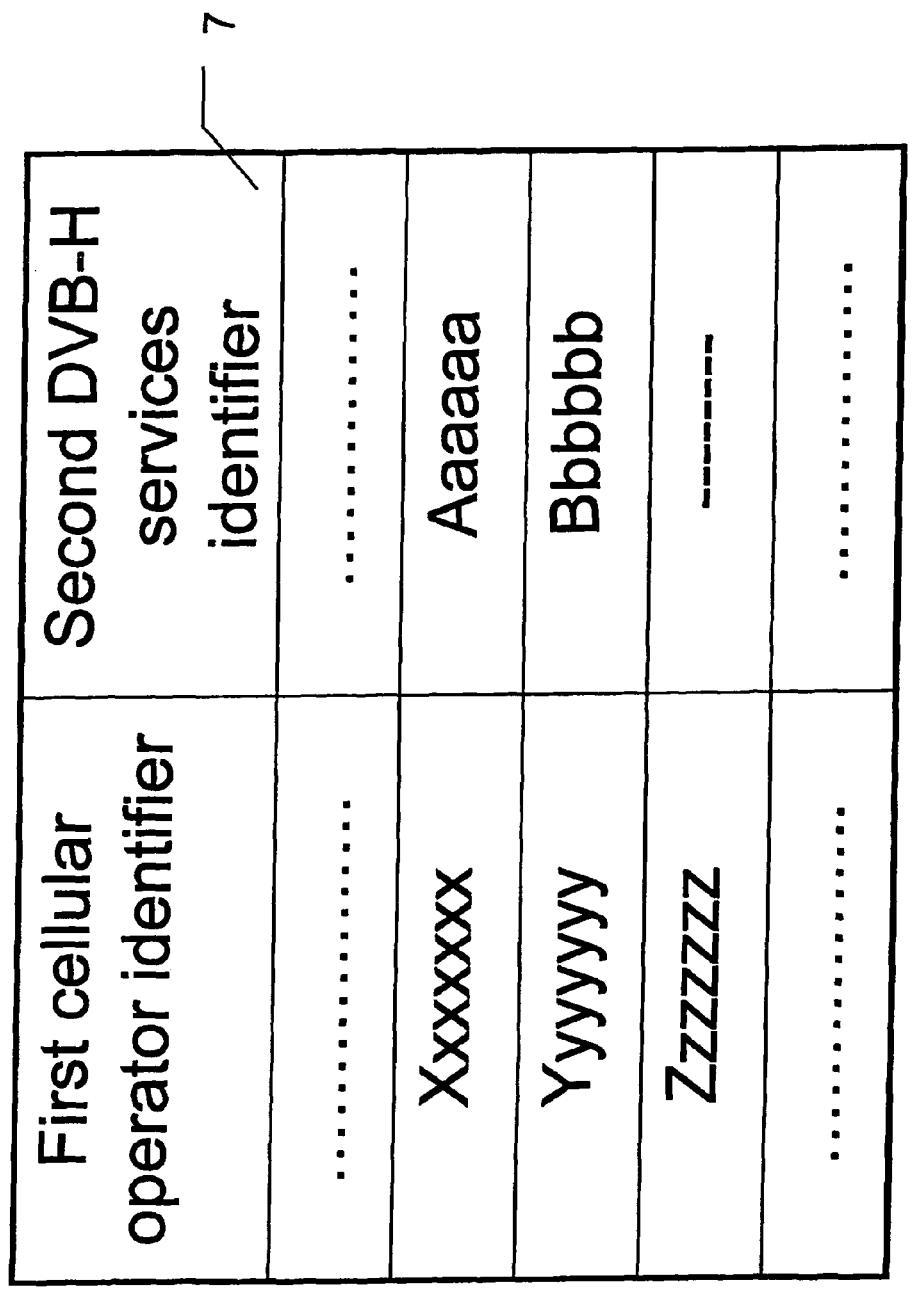
FIG. 3 schematically shows an example of mapping table according to an embodiment of the invention.

In particular, according to the embodiment of FIG. 3, the modules of processing unit 3 are adapted to look the mapping table 7 up in order to check if the first identifier of the cellular visited operator of cellular visited network 200 (e.g., Xxxxxxx) is contained in the mapping table 7 and, in the positive, to retrieve from it the second identifier (e.g., Aaaaaa) associated therewith.

For example, the second identifier is a DVB-H platform_Id of an IP platform managed by the cellular visited operator of the cellular visited network 200.

Once retrieved the second identifier identifying the DVB-H services offered by the cellular visited network 200, the modules of the processing unit 3 are, for example, adapted to write it in the memory area 6 of the DVB-H/cellular device 1.

In the example, the DVB-H receiver 2 comprises modules adapted to read the second identifier from the memory area 6 and to use it for identifying the DVB-H services offered by the cellular visited operator of the cellular visited network 200, among the flow of DVB-H data picked up by an antenna 9 thereof.

The DVB-H/cellular handheld device 1 is thus enabled to provide the user with an electronic service guide (ESG) comprising and showing a list of services (e.g., TV channels; audio/video streaming services) offered by the cellular operator of the cellular visited network 200.

Figure 4:
FIG. 4 schematically shows an example of mapping table according to another embodiment of the invention.

FIG. 4 shows another example of mapping table 7 according to the invention that, with respect to the table of FIG. 3, comprises further information indicating if the cellular visited operator is a roaming partner of the home operator, if the cellular visited operator is a preferred roaming partner of the home operator and if the cellular visited operator offers DVB-H services.

According to this example of the invention, the following actions (shown in the flow chart of FIG. 5) may be carried out by the modules of the processing unit 3 and of the DVB-H receiver 2.

Firstly, the modules of processing unit 3 will be adapted to look the mapping table 7 up, based on the first cellular visited operator identifier (e.g., Xxxxxxx) received at the cellular receiver 5, in order to check if the cellular visited operator identified by said first identifier is a roaming partner of the home operator (block 300).

In the negative, the DVB-H/cellular device 1 is enabled neither to roam in the cellular visited network 200 nor to make use of the DVB-H services offered by it (block 301).

In the positive, the modules of processing unit 3 check in the mapping table 7 if the cellular visited operator identified by said first identifier is a preferred roaming partner of the home operator (block 302).

In the negative, the DVB-H/cellular device 1 is enabled, according to a conventional authorization procedure, to roam in the cellular visited network 200 but not to make use of the DVB-H services (block 303).

In the positive, the modules of processing unit 3 check in the mapping table 7 if the cellular visited operator identified by said first identifier offers DVB-H services (block 304).

In the negative, the DVB-H/cellular device 1 is enabled, according to a conventional authorization procedure, to roam in the cellular visited network 200 but not to make use of the DVB-H services (block 305.

In the positive, the modules of processing unit 3 retrieve the second identifier (e.g., Aaaaaa) that, in the mapping table 7, is associated with the first identifier (e.g., Xxxxxxx) of the cellular visited operator (block 306).

Then the modules of processing unit 3 write the retrieved second identifier in the memory area 6 and the modules of the DVB-H receiver 2 use such second identifier for accessing (e.g., identifying, visualizing and using) the DVB-H services offered by the cellular visited operator (block 307).

The DVB-H/cellular device 1 is thus enabled both to roam in the cellular visited network 200 and to access the DVB-H services offered thereby (block 308).

In particular, the DVB-H/cellular device 1 may advise the user, via proper user interface means, of the availability of roaming DVB-H services in the visited network (e.g. by showing proper indicators in the user interface and switching the DVB-H receiver on to obtain the ESG for displaying available services to the user).

Figure 5:
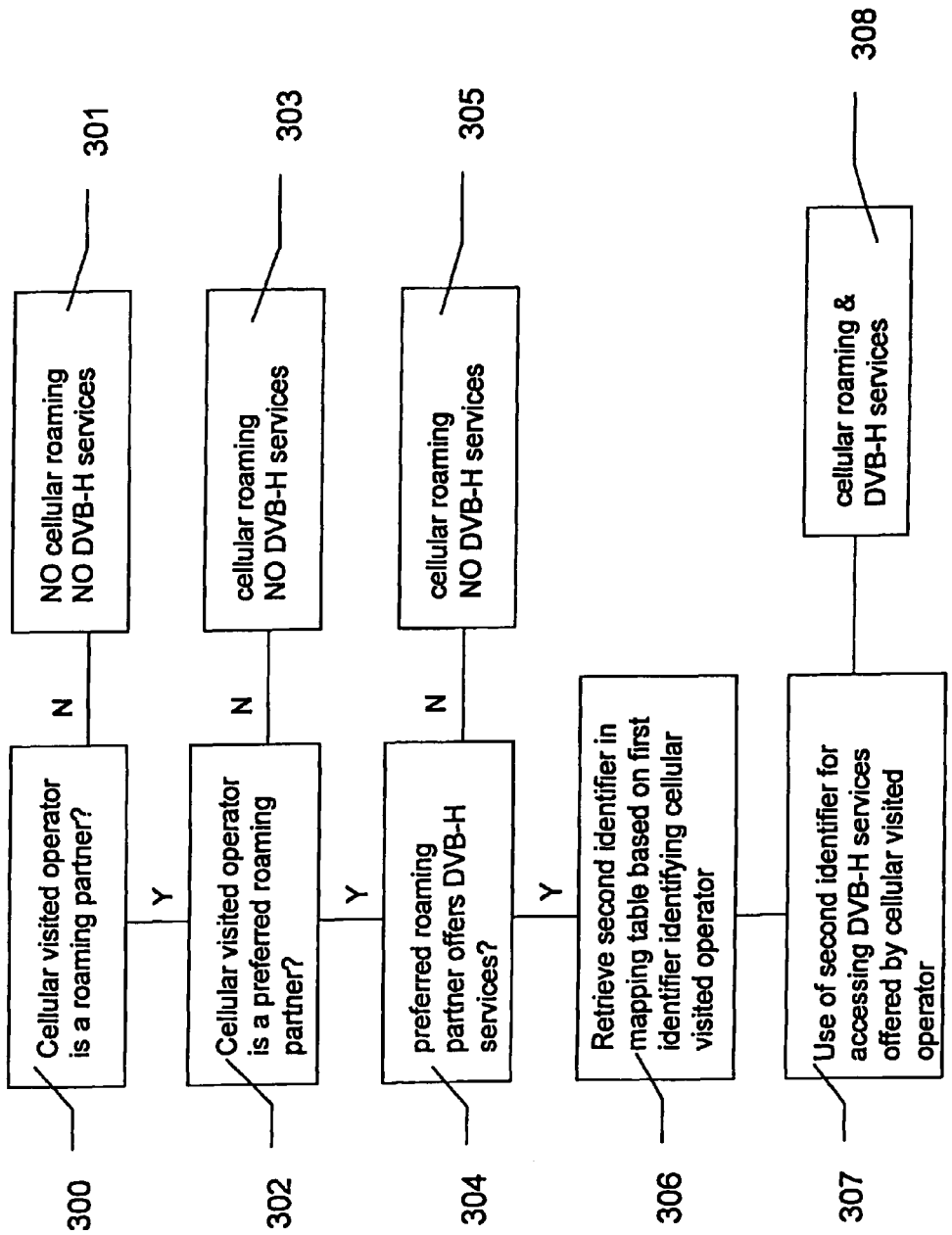
FIG. 5 shows a flow chart of the main actions carried out by the DVB-H/cellular device of FIG. 2, according to an example of the invention.

According to the example of FIG. 5, the DVB-H/cellular device 1 is enabled to make use of the DVB-H services (if any) offered by the cellular visited operator only if the latter is a preferred roaming partner of the home cellular operator.

However, it is noted that according to another example, actions at blocks 302 and 303 may be omitted so that the DVB-H/cellular device 1 may be enabled to make use of the DVB-H services (if any) offered by the cellular visited operator even if the latter is simply a roaming partner (not preferred) of the home cellular operator.

So far, the situation in which DVB-H/cellular device 1 roams into cellular visited network 200 has been contemplated.

However, similarly to what disclosed above, also when the DVB-H/cellular device 1 is within the cellular home network 100, he is required to know the appropriate identifying information to identify, among the data flows picked up by the antenna 9 of the DVB-H receiver 2, the data carrying the DVB-H services offered by the home operator.

According to a preferred embodiment of invention, said appropriate identifying information is retrieved by DVB-H/cellular device 1 based on the cellular time operator identifier, analogously to what disclosed above.

On this purpose, the cellular home operator identifier will be stored in the storage area 4 (e.g., on the mapping table 7) in association with a second identifier identifying the DVB-H services offered by the home operator (e.g., the identifier of the IP platform managed by the home operator).

Moreover, the modules of the cellular receiver 5 will be adapted to receive (e.g., at the switching on of the DVB-H/cellular device 1 or when the latter goes back into the cellular home network 100 after roaming within a cellular visited network) a first identifier identifying the cellular home operator.

In their turn, the modules of the processing unit 3 will be adapted to check, according to techniques well known in the art of cellular telephony, if the first identifier received at the cellular receiver 5 identifies the cellular home operator and, in the positive, to carry out a conventional authorization procedure to register the DVB-H/cellular device 1 in the cellular home network 100.

Once successfully terminated the authorization procedure, the modules of processing unit 3 will be adapted to retrieve the second identifier, if any, that in the storage area 4 (e.g., in the mapping table 7) is associated with the first identifier identifying the cellular home operator.

The invention claimed is:

1. A method for enabling a broadcast/cellular device within an area covered by a cellular network to access packet mobile digital broadcast services offered by a cellular operator of said cellular network comprising:
   maintaining, in a storage area accessible by the broadcast/cellular device, a mapping table comprising a plurality of first identifiers and a corresponding plurality of second identifiers, the first identifiers identifying a plurality of cellular operators, wherein each first identifier is associated with a respective second identifier which allows identifying the packet mobile digital broadcast services offered by the corresponding cellular operator, followed by:
   a) when roaming in said cellular network, obtaining at a cellular receiver of the broadcast/cellular device one of the plurality of first identifiers identifying the cellular operator;
   b) accessing the storage area in order to retrieve the corresponding one of the plurality of second identifiers, the second identifier identifying and enabling access to the packet mobile digital broadcast services offered by the cellular operator, based on the first identifier obtained in a); and
   b') using the second identifier retrieved in b) for providing a user of the broadcast/cellular device with an electronic service guide comprising a list of services offered by the cellular operator.

2. The method according to claim 1, further comprising c) obtaining an authorization to register the broadcast/cellular device in the cellular network.

3. The method according to claim 2, wherein the execution of b) is subordinated to c).

4. The method according to claim 1, further comprising d) checking if said first identifier obtained in a) identifies a cellular roaming partner operator.

5. The method according to claim 4, wherein b) is executed in an affirmative case of d).

6. The method according to claim 4, further comprising c) obtaining an authorization to register the broadcast/cellular device in the cellular network, wherein c) is executed in the affirmative case of d).

7. The method according to claim 1, further comprising e) checking if said first identifier obtained in a) identifies a cellular home operator.

8. The method according to claim 7, wherein b) is executed in the affirmative case of e).

9. The method according to claim 7, further comprising c) obtaining an authorization to register the broadcast/cellular device in the cellular network, wherein c) is executed in the affirmative case of e).

10. The method according to claim 7, further comprising d) checking if said first identifier obtained in a) identifies a cellular roaming partner operator, wherein d) is executed in the negative case of e).

11. The method according to claim 1, wherein the first identifier is associated with said second identifier in said storage area.

12. The method according to claim 11, wherein said storage area is in a subscriber identity module card accessible by the broadcast/cellular device.

13. The method according to claim 1, further comprising using the second identifier retrieved in b) for identifying, among data flows reaching the broadcast/cellular device, packet mobile digital broadcast services offered by the cellular operator identified by the first identifier.

14. The method according to claim 1, wherein the second identifier comprises a platform identifier identifying a packet mobile digital broadcast service platform managed by the cellular operator.

15. A broadcast/cellular handheld device comprising:

a cellular receiver and a processing unit, said broadcast/cellular handheld device being configured to access a storage area, said storage area being configured to maintain a mapping table comprising a plurality of first identifiers and a corresponding plurality of second identifiers, the first identifiers identifying a plurality of cellular operators, wherein each first identifier is associated with a respective second identifier which allows identifying the packet mobile digital broadcast services offered by the corresponding cellular operator, the cellular receiver comprising modules that, when the broadcast/cellular device is within a coverage area of a cellular network, are configured to receive one of the plurality of first identifiers identifying a cellular operator of said cellular network, and the processing unit comprising modules configured to access the storage area in order to retrieve the corresponding one of the plurality of second identifiers, the second identifier identifying and enabling access to packet mobile digital broadcast services offered by said cellular operator, based on said first identifier identifying the cellular operator, wherein the processing unit comprises modules configured to use the second identifier to provide a user of the broadcast/cellular device with an electronic service guide comprising a list of services offered by the cellular operator.

16. The broadcast/cellular handheld device according to claim 15, wherein, in said storage area, the first identifier is associated with said second identifier.

17. The broadcast/cellular handheld device according to claim 16, wherein the storage area is in a subscriber identity module card accessible by the broadcast/cellular handheld device.

18. The broadcast/cellular handheld device according to claim 15, wherein the modules of the processing unit are configured to check if said first identifier identifies a cellular roaming partner operator and to retrieve the second identifier in the affirmative case.

19. The broadcast/cellular handheld device according to claim 15, wherein the modules of the processing unit are configured to check if said first identifier identifies a cellular home operator and to retrieve the second identifier in the affirmative case.

20. The broadcast/cellular handheld device according to claim 15, wherein the broadcast/cellular handheld device further comprises a broadcast receiver comprising modules configured to use the second identifier retrieved from the processing unit for identifying, among data flows reaching said processing unit, packet mobile digital broadcast services offered by the cellular operator identified by the first identifier.

* * * * *